United States Patent
Culbert et al.

(10) Patent No.: US 8,728,368 B2
(45) Date of Patent: May 20, 2014

(54) METHOD FOR CRYSTALLIZING CRYSTALLIZABLE POLYMERS HAVING A HIGH TENDENCY TO AGGLOMERATE

(75) Inventors: Brent Allan Culbert, Wil (CH); Andreas Christel, Zuzwil (CH); Mauricio Rodrigues, Poços de Caldas - MG (BR)

(73) Assignee: Bühler Thermal Processes AG, Oberbüren (CH)

( * ) Notice: Subject to any disclaimer, the term of this patent is extended or adjusted under 35 U.S.C. 154(b) by 583 days.

(21) Appl. No.: 12/742,714

(22) PCT Filed: Sep. 22, 2008

(86) PCT No.: PCT/CH2008/000389
§ 371 (c)(1),
(2), (4) Date: May 13, 2010

(87) PCT Pub. No.: WO2009/062321
PCT Pub. Date: May 22, 2009

(65) Prior Publication Data
US 2010/0267922 A1 Oct. 21, 2010

(30) Foreign Application Priority Data
Nov. 16, 2007 (DE) .......... 10 2007 055 242

(51) Int. Cl.
*B29B 9/00* (2006.01)
*B29B 9/16* (2006.01)

(52) U.S. Cl.
USPC ............. 264/140; 264/69; 264/141; 264/142; 264/143; 264/211.12; 264/211.2; 264/237; 528/308.2; 528/308.3

(58) Field of Classification Search
None
See application file for complete search history.

(56) References Cited

U.S. PATENT DOCUMENTS

| | | | |
|---|---|---|---|
| 2,284,671 A * | 6/1942 | Meinzer | 209/325 |
| 3,014,011 A | 12/1961 | Zoetbrood | |
| 3,544,523 A * | 12/1970 | Maxion | 525/437 |
| 3,544,525 A | 12/1970 | Balint et al. | |
| 3,746,688 A | 7/1973 | Berkau | |
| 3,988,085 A * | 10/1976 | Krchma | 425/71 |
| 5,186,959 A * | 2/1993 | Tanaka | 425/215 |
| 5,290,913 A * | 3/1994 | McAllister et al. | 528/483 |
| 5,919,872 A | 7/1999 | Tung | |
| 7,204,945 B2 * | 4/2007 | Bonner | 264/143 |
| 2004/0236063 A1* | 11/2004 | Suzuki et al. | 528/275 |
| 2005/0065315 A1* | 3/2005 | Bonner et al. | 528/272 |
| 2005/0085620 A1 | 4/2005 | Bruckmann | |
| 2005/0110182 A1* | 5/2005 | Eloo | 264/69 |
| 2007/0129501 A1* | 6/2007 | Chen et al. | 525/329.4 |
| 2007/0220712 A1* | 9/2007 | Busch et al. | 23/295 R |
| 2007/0274789 A1* | 11/2007 | DeBruin et al. | 406/197 |

FOREIGN PATENT DOCUMENTS

| | | |
|---|---|---|
| DE | 2118434 | 10/1972 |
| DE | 69525132 | 5/1996 |
| DE | 10204954 | 6/2003 |
| DE | 102005029501 | 11/2006 |
| EP | 0541674 | 9/1994 |
| EP | 1203040 | 5/2002 |
| EP | 1710066 | 10/2006 |
| WO | 2005/044901 | 5/2005 |
| WO | 2006/021118 | 3/2006 |
| WO | 2006/127698 | 11/2006 |
| WO | 2007/025903 | 3/2007 |

* cited by examiner

*Primary Examiner* — Jeffrey Wollschlager
(74) *Attorney, Agent, or Firm* — Shoemaker and Mattare (57) ABSTRACT

The invention relates to a method for producing a semicrystalline polymer, said method comprising the following steps: producing a polymer melt from a crystallizable polymer; shaping particles and solidifying the polymer melt, the step of shaping the particles being carried out before or after solidification; cooling the particles; treating the particles to reduce their tendency to agglomerate; crystallizing the particles. The invention is characterized in that the treatment is carried out by shaking at a temperature T1 which is below the glass transition temperature of the polymer plus 10° C., i.e. $T1 < Tg + 10°$ C.

26 Claims, 3 Drawing Sheets

METHOD FOR CRYSTALLIZING CRYSTALLIZABLE POLYMERS HAVING A HIGH TENDENCY TO AGGLOMERATE

Methods for crystallizing polymers are used on a large scale for facilitating the storage, the transport, the treatment or processing of the polymers. Depending on the crystallization rate of the polymers, the crystallization takes place spontaneously during the production of polymer particles or a separate process step must be carried out for crystallization. Depending on the tendency of a polymer to agglomerate, the process conditions in the crystallization process must be chosen to ensure a stable process which excludes formation of agglomerated particles. The tendency to agglomerate is dependent on the composition of the polymer but also on its properties on entry into the crystallization process. Various attempts have been made to modify the entry conditions so that the tendency of polymers to agglomerate decreases.

U.S. Pat. No. 3,746,688 (Berkau) describes a reduction of the tendency of PET to agglomerate in the crystallization process by prior drying for several hours.

U.S. Pat. No. 3,014,011 (Zoetbrood) describes a reduction of the tendency of PET to agglomerate in the crystallization process by prior treatment with a swelling agent the swelling agent used being in particular water.

Apart from the opposite influence, which is attributed here to the water in the PET during the crystallization, such processes for changing the water content are expensive and require long process times. In no case is it pointed out that the process can be substantially simplified by combination with the pelletizing process and that the tendency of the pellets to agglomerate before the crystallization can be reduced.

U.S. Pat. No. 5,919,872 (Tung et al.) describes the use of coating materials for reducing the tendency to agglomerate. However, such coating materials change the composition of the polymer, which is not acceptable for every application.

A multiplicity of patents links the pelletizing to a subsequent crystallization (U.S. Pat. No. 3,544,525, Balint et al.; EP1203040, Borer et al.; and US2005/0085620 Bruckmann), the pellets being kept at a temperature at which crystallization takes place, which leads to an immediate beginning of the crystallization. A reduction of the tendency to agglomerate prior to crystallization is therefore not possible.

U.S. Pat. No. 7,204,945 (Bonner) describes a direct combination of the pelletizing with the subsequent crystallization slightly below the crystallization temperature. However, it is not pointed out that the tendency of the pellets to agglomerate prior to crystallization can be reduced.

WO06/021118 (Christel et al.) describes a process in which prior heating of polymer particles before the crystallization by means of process heat from the subsequent solid-state polycondensation is effected. However, it is not pointed out that the tendency of the pellets to agglomerate prior to crystallization can be reduced.

It is an object of the present invention, while avoiding the abovementioned disadvantages, to provide a method which reduces the tendency of a polymer to agglomerate.

This object is achieved, according to the invention, by providing a method for the preparation of a semicrystalline polymer which comprises the steps: preparation of a polymer melt from a crystallizable polymer, forming of particles and solidification of the polymer melt, cooling of the particles, treatment of the particles and crystallization of the particles, the treatment comprising shaking at a temperature which is below the glass transition temperature of the polymer +10° C. This gives polymer particles having such a reduced tendency to agglomerate that continuous crystallization with a substantially lower back-mixing ratio can be achieved, with the result that the necessary residence time for crystallization is reduced and hence the size and the energy consumption of the required crystallization apparatuses also decreases.

Suitable polymers are crystallizable thermoplastic polymers. The polymers are obtained by a polymerization reaction, such as, for example, free radical, anionic or cationic polymerization, polyaddition or polycondensation, from their monomers. Polymers of one polymer type are obtained from the same main monomers. A limited amount of further monomers, so-called comonomers, may be used. An example is polyoxymethylene (POM), which is usually prepared by cationic or anionic polymerization from its monomer formaldehyde or its trimer trioxane. In particular, these are crystallizable thermoplastic polycondensates, such as polyamide, polyester, polycarbonate, polyhydroxyalkanoates, polylactides or copolymers thereof.

Polycondensates are obtained by a polycondensation reaction with elimination of a low molecular weight reaction product. The polycondensation can be effected directly between the monomers or via an intermediate, which is then reacted by transesterification, it being possible for the transesterification in turn to be effected with elimination of a low molecular weight reaction product or by ring-opening polymerization. The polycondensate thus obtained is substantially straight-chain, it being possible for a small number of branches to form.

Polycondensates of one polymer type are obtained from the same main monomers. A limited amount of further monomers, so-called comonomers, may be used.

Polyester is a polymer which is usually obtained by polycondensation from its monomers, a diol component and a dicarboxylic acid component. Various, generally straight-chain or cyclic diol components are used. It is also possible to use various, generally aromatic dicarboxylic acid components. Instead of the dicarboxylic acid, it is also possible to use its corresponding dimethyl esters. Typical examples of the polyesters are polyethylene terephthalate (PET), polybutylene terephthalate (PBT) and polyethylene naphthalate (PEN), which are used either as homopolymer or as copolymers.

The polyethylene terephthalate is obtained from its monomers, a diol component and a dicarboxylic acid component, the diol components as main monomer consisting of ethylene glycol (1,2-ethanediol) and the dicarboxylic acid components as main monomer consisting of terephthalic acid. Suitable comonomers are further straight-chain, cyclic or aromatic diol and dicarboxylic acid compounds. Typical comonomers are diethylene glycol (DEG), isophthalic acid (IPA) or 1,4-bishydroxymethylcyclohexane (CHDM). Suitable polyethylene terephthalates have an intrinsic viscosity in the range from 0.3 to 1 dl/g, measured with 0.5 g of PET in 100 ml of phenol/dichlorobenzene (1:1).

Polyhydroxyalkanoates are polymers which are obtained by polycondensation from its monomers, having the general formula HO—CH(R)—(CH2)n-COOH, where R is usually an aliphatic hydrocarbon having 1 to 15 carbon atoms and n is from 1 to 10, usually from 1 to 3. A typical example is polyhydroxybutyrate where R=CH3 and n=1.

The polylactides (known as polylactic acid, PLA) are polymers which can be obtained directly with elimination of water from lactic acid or by ring-opening polymerization from its cyclic dimers (lactides).

The polymer may be a fresh material or a recycled material. Reprocessed polymers from manufacturing and processing processes (post-industrial) or polymers collected after use by consumers and reprocessed (post-consumer) are designated as recycled materials.

Additives may be added to the polymer. Suitable additives are, for example, catalysts, dyes and pigments, UV blockers, processing auxiliaries, stabilizers, impact modifiers, chemical and physical blowing agents, fillers, nucleating agents, flame retardants, plasticizers, barriers or particles improving mechanical properties, reinforcing bodies, such as beads or fibers, and reactive substances, such as, for example, oxygen absorbers, acetaldehyde absorbers or substances which increase the molecular weight, etc.

The preparation of a polymer melt is effected in apparatuses or reactors known in the prior art. In principle, polymerization reactors in which polymers are prepared in the liquid phase, such as, for example, stirred tanks, cage reactors or disk reactors, or apparatuses in which previously prepared polymers are melted, such as, for example, extruders or kneaders, are suitable. The polymer melt preparation can be effected continuously or batchwise. However, continuous processes are preferred for the further processing.

Undesired volatile substances, such as impurities from a recycled material, remaining solvents from polymer preparation and monomers, dimers, oligomers or cleavage products from the polymer melt preparation, can be removed via a devolatilization apparatus, such as a thin-film evaporator or extruder, in particular a multiscrew extruder, such as twin-screw extruder or ring extruder. Further process steps, such as, for example, pressure generation, filtration, heating or mixing, may be part of the preparation of a polymer melt.

The particles can be formed from the polymer melt in various ways. Comminution of fragments, extrudates or strips which were formed from the polymer melt or direct forming of particles, for example by dripping or atomization, can be employed.

Pelletizing methods in which individual polymer extrudates are formed from the polymer melt in a discharge apparatus, in particular a die or die plate, are generally used. For the production of pellets from the polymer extrudates, it is possible to use pelletizing techniques known in the prior art, such as extrudate pelletizing, water-ring pelletizing, underwater pelletizing or hot face pelletizing, dripping or atomization. The polymer extrudates which emerge from the melt channels are solidified and are separated into a multiplicity of individual pellets, it being possible to effect the separation before or after the solidification.

In spite of the use of the term "water" in the designation of the pelletizing devices, other liquid media may also be used.

The separation into particles is effected, for example, by independent drop formation, by the use of a liquid shear medium or by mechanical separation, in particular cutting. While independent drop formation or drop formation forced by a shear medium takes place at the die outlet, cutting can be effected either directly at the die outlet or only after passing through a treatment zone.

The solidification of the polymer melt takes place by cooling with the aid of one or more cooling fluids, it being possible for these to be gaseous (e.g. air, nitrogen or CO2) or liquid (e.g. water or ethylene glycol) cooling media or a combination thereof. If a liquid cooling medium is used, it must be subsequently separated off from the particles. This can be effected, for example, by extraction by suction, by a gas stream, by an impact dryer or by a centrifugal dryer.

The mean particle size should be from 0.5 mm to 10 mm, preferably from 1.5 mm to 5 mm and in particular from 2 to 3.5 mm. The mean particle size is the statistical mean value of the mean particle diameter which results from the average of particle height, particle length and particle width.

The preferred pellet weight is from 2 to 100 mg, in particular more than 5 mg, particularly preferably more than 10 mg and in particular less than 50 mg, particularly preferably less than 30 mg.

The particles should preferably have a defined pellet shape, such as, for example, cylindrical, spherical, drop-like or sphere-like, or a design shape, as proposed, for example, in EP 0541 674 (Yau). Solid particles or porous particles, which are obtained, for example, by sintering, foaming and the like, can be used.

The cooling of the particles can be effected as part of the particle production or can be continued after the particle production. It is possible to use the same cooling fluid as in the particle production. However, other cooling fluids may also be used. Alternatively, other cooling apparatuses known in the prior art may also be used.

The contact conditions of cooling medium and polymer particles should be chosen so that the degree of crystallization of the polymer particles after cooling is less than 10%, in particular less than 5%.

The forming of the polymer particles is followed by a step for at least partial crystallization, in a crystallization reactor, according to the methods known in the prior art. The crystallization can be effected continuously or batchwise. Usually, the crystallization is effected by a thermal method. The heat required for this purpose can be supplied via a heated wall of the crystallization reactor, via heated internals in the crystallization reactor, by radiation or by blowing in a hot process gas.

The crystallization should be effected at a suitable temperature over a suitable residence time. The crystallization should achieve at least a degree of crystallization which permits a further thermal treatment, such as, for example, drying or solid-state polycondensation, without agglomeration or formation of lumps occurring there.

The suitable temperature range is evident if the crystallization half-life ($t\frac{1}{2}$), measured by DSC, is plotted as a function of the temperature. It has upper and lower temperature limits at which the crystallization half-life reaches approximately 10 times the minimum crystallization half-life $t\frac{1}{2}$ min. Since very short crystallization half-lives ($t\frac{1}{2}$) can be determined only with difficulty, $t\frac{1}{2}$ min=1 minute is used as the minimum value.

The suitable crystallization time is obtained from the time for heating up the product to the crystallization temperature plus at least the crystallization half-life at the given temperature, preferably 2-20 half-lives being added to the heat-up time in order to achieve sufficient crystallization.

In the case of polyethylene terephthalate, the temperature range is from 100 to 220° C., and a degree of crystallization of at least 20%, preferably of at least 30%, is reached.

In order to prevent agglomerization of the crystallizing polymer particles, these should be kept in motion relative to one another. This can be effected, for example, by the use of a stirrer, of a moving container or under the action of a fluidization gas.

Suitable crystallization reactors are vibrating reactors, rotating reactors, reactors having stirrers and reactors through which a process gas flows, it being necessary for the flow rate of the process gas to be sufficient to move the polymer particles. Particularly suitable crystallization reactors are fluid-bed or fluidized-bed crystallizers.

Simultaneously with the raising of the degree of crystallization, any residues of a liquid from the pelletizing process are also removed.

If a circulating process gas is used in the crystallization process, sufficient fresh gas or purified process gas must be added to said circulating process gas in order to prevent excessive enrichment of the liquid. Process gases which may be used are, for example, air, nitrogen, CO2, steam or mixtures thereof.

A plurality of apparatuses for the production of particles can be connected to a crystallization apparatus. This has the advantage that, in the case of an alternating operational plurality of apparatuses for the production of particles, a constant amount of particles is fed to the crystallization apparatus.

Optionally, the step for raising the degree of crystallization is followed by a further step for thermal treatment. The thermal treatment can be effected in vacuo or with a gas flowing through. This may be a step for the further development of the crystal structure, a step for drying or moistening, a step for solid-state polycondensation (SSP) and/or a step for removing undesired volatile substances, such as impurities from a recycled material, remaining solvents from the polymer preparation and monomers, dimers, oligomers or cleavage products from the polymer melt preparation. Examples of the removal of undesired substances are the removal of residual monomers or dimers from polyamides, polyhydroxyalkanoates or polylactides, and the removal of impurities from repelletized PET bottle material. SSP methods are sufficiently well known in the prior art and are described, for example, in Modern Polyesters (Modern Polyesters, Wiley Series in Polymer Science, edited by J. Scheirs, T. Long: John Wiley & Sons, 2003).

Directly after the crystallization or following the further step of thermal treatment, the polymer particles can be cooled to a temperature suitable for storage. The cooling is effected by methods known in the prior art, for example in plate-type heat exchangers, in fluid-bed coolers, in conveying units with an excess of cooling medium, by direct introduction into a cooling liquid or by contact with a cold surface. Subsequently, the polymer particles can be processed to give products such as, for example, fibers, ribbons, pipes, films, extrusion blow-molded parts, injection molded parts or sintered parts. Polyethylene terephthalate is processed to a large extent, for example, to give hollow bodies, in particular bottles.

The polymer particles can also be processed directly after the crystallization or following the further step for thermal treatment to give products.

According to the invention, a step for the treatment of the particles, for the reduction of their tendency to agglomerate, is effected between the cooling of the particles and the crystallization of the particles. Surprisingly, this treatment can be carried out at relatively low temperatures, in a short time. For this purpose, it is necessary to expose the polymer particles to an energy input by shaking.

Any method for causing frequent mechanical impacts on the polymer particles is designated as shaking. The shaking can be effected directly by a moving surface, i.e. by transmission of mechanical energy. The shaking can also be effected indirectly by a fluid in such a way that the particles are subject to frequent collisions with other particles or solid surfaces. Shaking by transmission of mechanical waves, such as sound waves, by means of which the particles can be excited, is also conceivable. A further possibility consists in the use of the electromagnetic waves, excitation of the particles being effected here from the inside, i.e. by excitation of the constituents inside the particles. An example of this is the excitation of water molecules which may be dissolved in the particles by microwaves, in particular pulsed microwaves, i.e. microwave pulses.

According to the invention, the shaking is effected at a temperature T1, where T1 is below the glass transition temperature (Tg) of the polymer plus 10° C. (T1<Tg+10° C.). A temperature T1>Tg−60° C., in particular T1>Tg−40° C., particularly preferably T1>Tg−30° C., is specified as a lower limit. A temperature T1<Tg+5° C., in particular T1<Tg, is preferred as an upper limit. If the polymer is a polyethylene terephthalate or one of its copolymers, the temperature T1 is preferably in the range from 30° C. to 85° C., in particular in the range from 50° C. to 80° C.

The particles are cooled in the preceding cooling step to a temperature T2. The treatment according to the invention can be achieved if the cooling of the particles is effected to a temperature T2 in the range from Tg−60° C. to Tg+10° C., in particular to a temperature T2 in the range from Tg−40° C. to Tg+5° C. The treatment can then be effected directly after the cooling. The storage or buffering of the particles between the two steps (cooling and treatment) is possible only if the temperature of the particles does not fall below a suitable temperature T1 during this procedure.

Alternatively, the treatment according to the invention can be achieved if the cooling of the particles is effected to a temperature T2 below Tg−40° C. and in particular below Tg−60° C. This permits longer-term storage and/or permits transport if the two steps (cooling and treatment) take place in different locations. Prior to the treatment, heating to a suitable temperature T1 is then effected. The heating and the treatment can take place in separate apparatuses. Preferably, the heating and the treatment take place in the same apparatus. Apparatuses in which the particles are fluidized with the aid of a hot process gas, such as, for example, fluid-bed or fluidized-bed apparatuses, are particularly suitable for this purpose. The heated gas stream simultaneously results in heating and shaking. Usually, the temperature of the process gas should not exceed a temperature Tg of the polymer plus 20° C. during this procedure, since the still amorphous particles may have a very high tendency to agglomerate above their Tg. Any desired gases may be used as process gas, provided that they do not adversely affect the properties of the polymers. Usually, air, nitrogen, steam or CO2 is used. However, it is also possible to use gases which have a swelling effect on the polymer.

The glass transition temperature (also glass transition point Tg) is determined by means of differential scanning calorimetry (DSC) and corresponds to the temperature of the point of inflection in the region of the transition of the amorphous phase from the glassy state to the plastic state. The Tg is measured on the dry product at a heating rate of 10° C./min.

The required duration of shaking depends to a great extent on the method and intensity of the shaking. According to one embodiment of the present invention, the intensity and duration of the shaking should be chosen so that the tendency of the particles to agglomerate in the subsequent crystallization process decreases by at least a factor of 2 or vanishes completely. The determination of the tendency to agglomerate is effected by means of a standardized test for the tendency to agglomerate.

For assessing the tendency of a polymer to agglomerate in the crystallization process, polymer particles are crystallized in a cylinder having a perforated-plate bottom by means of a process gas at a suitable crystallization temperature until primary crystallization is substantially complete. Polymers having a high tendency to agglomerate stick together in this process to give large agglomerates or even to give an agglomerated block.

The amount of process gas is chosen so that the gas velocity in the cylinder is substantially above the loosening rate of the polymer particles. Thereafter, the agglomerated polymer particles are subjected to pressure pulses until the agglomerates loosen and disintegrate into individual pellets. The number of pressure pulses at a given pressure corresponds to the tendency of the particles to agglomerate in the crystallization process.

According to a further embodiment of the present invention, the intensity and the duration of the shaking should be chosen so that the Tg discontinuity in the DSC increases by at least a factor of 1.2, in particular by a factor of 1.3. Such a Tg discontinuity increase is known from T. Yoshii et al., Thermochimica Acta 431 (2005) 177-181. Here, however, the treatment is effected purely thermally, and very long treatment times are required. A time of more than 170 hours is described. According to the invention, the treatment by shaking is substantially shorter, average maximum treatment times of less than 30 minutes, in particular less than 15 minutes, being preferred. The preferred average minimum treatment time is more than 0.5 minute, in particular more than 1 minute.

The endothermic shift of the heat flux signal in mW on exceeding the glass transition temperature is designated as a Tg discontinuity in the DSC. The Tg discontinuity is measured on dry product at a heating rate of 10° C./min. The Tg discontinuity is obtained by multiplying the slope at the point of inflection by the time difference between onset and endset. The onset is obtained from the point of intersection between the base line before the glass transition and the extrapolated slope at the point of inflection. The endset is obtained from the point of intersection between the base line after the glass transition and the extrapolated slope at the point of inflection. If a peak is present at the beginning or at the end of the glass transition, the extrapolated peak maximum is used as onset or the endset. The Tg discontinuity must be measured on samples having the same weight or must be standardized to a weight unit.

The intensity of shaking is obtained from the number of impacts which are transmitted on average to each particle and from the energy which is transmitted on average per impact.

According to a preferred embodiment, the average number of impacts is more than 150, in particular more than 300, particularly preferably more than 500. A uniform treatment of the total surface is ensured thereby, with the result that an effective reduction of the tendency to agglomerate in the subsequent crystallization process is ensured. An upper limit is obtained from the maximum treatment time (30 minutes) and the maximum possible number of impacts per second, which is assumed to be 100 for a mechanically moved apparatus and to be 10 for an apparatus in which the shaking is effected indirectly by a fluid. This gives 180 000 and 18 000 impacts, respectively. The preferred frequency for mechanically moved apparatuses is less than 50, in particular less than 20, impacts per second, with the result that the maximum possible number of impacts is reduced to 90 000, in particular 36 000. The preferred frequency for apparatuses moved indirectly via a fluid is less than 5, in particular less than 3, impacts per second, with the result that the maximum possible number of impacts is reduced to 9000, in particular 5400.

The number of impacts is calculated from the residence time, divided by the cycle time, multiplied by the number of impacts per cycle. For continuous processes, the mean residence time is used. The cycle time (t) is specified in an apparatus-specific manner, can be set or is obtained from the process conditions. Thus, for example, in the case of a vibrating sieve, the frequency is known. In the case of a rotating drum, the rotational speed is known. In the case of a fluidized bed which is produced by a pulsating gas stream, the pulsation frequency is known.

In the case of a fluidized bed in a constant gas stream, the cycle time is obtained from the expansion height (h) of the fluidized bed, as follows:

The cycle time (t) corresponds to the rise (with the rise time ta) and fall (with the fall time tf) of the particles to the expansion height (h). $t=ta+tf$ where $ta=2 \cdot h/v0$ and $tf=2 \cdot h/v0$.

The initial velocity required for this purpose of the resulting final velocity (v0) is calculated from v0=square root of $(2 \cdot g \cdot h)$, where $g=9.81$ m/s$^2$. The expansion height (h) corresponds to the height difference between the expanded fluidized bed and the unfluidized bed.

The number of impacts per cycle can generally be only estimated.

In principle, 1 impact per cycle takes place in the case of a vertical up/down movement without an upward restriction. In the case of a horizontal right/left movement, there are 2 impacts per cycle. In the case of complex movements, 1 impact per cycle is used for simplicity.

In a rotating drum, the number of impacts is greatly dependent on the degree of filling and the type and number of internals. In a drum with a low degree of filling and with at least 2 product drivers, 2 impacts per revolution are used.

The energy which is transmitted on average per impact must be sufficient to ensure a change in the surface structure such that an effective reduction in the tendency to agglomerate in the subsequent crystallization process is ensured. According to a preferred embodiment, the average specific kinetic energy input per impact is more than 0.1 J/kg, in particular more than 0.5 J/kg. An upper limit is obtained from the maximum energy with which the particles are permitted to strike one another or to strike a surface without there being an excessive tendency to form dust. If a maximum impact velocity of 20 m/s is assumed, the maximum value for the average specific kinetic energy input per impact is 200 J/kg. At 10 m/s, the result is 50 J/kg.

The kinetic energy input per impact (Ez) is calculated from the moving mass (m) and the impact velocity (v0) via $Ez=(m/2) \cdot v0^2$. For the specific kinetic energy input per impact, this value must be divided again by the mass (m). The impact velocity is calculated from $v0=2 \cdot h/t$. Depending on the type of movement, h corresponds to the height of fall (in the case of upward and downward movement) or to half the amplitude (in the case of back and forth movement). Accordingly, t corresponds to the fall time or to a quarter of the cycle time.

According to a further preferred embodiment, the intensity of shaking, expressed as a total specific kinetic energy input, is more than 200 J/kg, in particular more than 400 J/kg, particularly preferably more than 800 J/kg. This ensures that the molecular surface structure of the particles is sufficiently rearranged to ensure an effective reduction of the tendency to agglomerate in the subsequent crystallization process. An upper limit is obtained from the maximum of the number of impacts times the energy transmitted on average per impact, these parameters not being freely selectable but being coupled via the maximum achievable acceleration. If, for example in the case of 5 impacts per second, an acceleration of 200 m/s^2 is assumed, this results in an energy per impact of 50 J/kg, which gives, over 30 minutes, a total specific kinetic energy input of not more than 900 000 J/kg. Usually, however, the total specific kinetic energy input remains below 60 000 J/kg.

The total specific kinetic energy input (E) is calculated from the number of impacts times the average specific kinetic energy input per impact.

The shaking via transmission of mechanical energy can be effected, for example, in an apparatus which executes a back and forth movement, a circular movement, an up and down movement, a tumbling movement, a rocking movement or a complex movement resulting through a combination, with the result that the particles are alternately accelerated and braked again. Examples of this are vibratory screens, gyratory screens, platform shakers, orbital or circular shakers, tumbling shakers, rocking shakers, 3-D shakers.

The shaking can also be effected in apparatuses in which the particles are repeatedly transported upward and then fall back. Examples of these are overhead shakers, rotators or rotating drums in which the particles are lifted by means of internals (product drivers).

Apparatuses in which the particles are transported by vibration can be used but are less preferred. Examples of these are vibrating troughs or helical conveyors. Such devices usually operate at frequencies in the range up to 50-200 Hertz, which permits only a low energy transmission per cycle.

Apparatuses in which relatively few but in some cases very strong impacts and/or shear forces act on the particles are not suitable and are therefore ruled out for the method according to the invention, since the treatment which is insufficiently uniformly distributed over the surface takes place as a result. These include pneumatic conveyor apparatuses, conveyor apparatuses by means of rotating screws or stirred containers.

Indirect shaking by a fluid can be effected, for example, in a fluid bed, pulsed bed, fluidized bed or effervescent bed apparatus. A fluid, in particular a process gas, flows through a bed of polymer particles in such a way that the polymer particles are fluidized. As a result of the fluidization, the particles are vertically accelerated and then fall back into the product bed. The conditions in the fluidized bed (fluidization height, fluidization frequency) can be influenced by the velocity with which the process gas flows through the bed and via the geometrical conditions of the bed (height of the bed, cross-section of the bed). A further possibility for influencing is by pulsed addition of the process gas. Suitable velocities (measured as superficial velocity) are from 1 to 6 m/s, in particular from 2 to 4 m/s.

Further process steps can be effected simultaneously with the treatment. Thus, heating to a suitable treatment temperature can take place in the same apparatus in which the treatment too is effected, for example fluid-bed or fluidized-bed apparatuses which are operated with a heated gas being suitable for this purpose. On the other hand, separation of the particles into various fractions which differ in their particle size, density or other properties can be effected during the treatment, for example gyratory screens, in which undesirably large and/or undesirably small particles are separated off during the treatment, being suitable for this purpose.

Preferably, no crystallization is effected during the treatment. The particles remain substantially amorphous. Usually, the increase in the enthalpy of crystallization, measured by DSC, is less than 5 J/g. The enthalpy of crystallization is measured by DSC at a heating rate of 10° C./min. The enthalpy of crystallization corresponds to the exothermal quantity of heat which is liberated in the region of primary crystal formation of the polymer.

Exemplary embodiments and further details appear in the attached figures and examples.

EXAMPLE 1

Air having a temperature of 60° C. flowed through 2.5 kg of pellets of polyethylene terephthalate having a comonomer content of 2 mol % of isophthalic acid, an IV value of 0.4 dl/g and a pellet weight of 15 mg in a cylinder having a perforated plate with a diameter of 20 cm for 15 minutes, resulting in a light fluidized bed whose average expansion exceeded the original height of fill by 8 cm. A cycle time of 0.46 second was established via a pulsator. This resulted in a specific kinetic energy input of 0.78 J/kg per impact or 1530 J/kg in total. The pellets remained free-flowing and transparent and amorphous during the entire test time. No agglomerates have formed.

EXAMPLE 2

Example 1 was repeated but with air having a temperature of 80° C. The pellets remained free-flowing and transparent and amorphous during the entire test time. No agglomerates have formed.

COMPARATIVE EXAMPLE 1

Example 1 was repeated but with air having a temperature of 90° C. The pellets have stuck together to give an agglomerated block but remained transparent and amorphous. Further processing was not possible. The pellet had a Tg of 72.2° C. and a Tg discontinuity of 87 mW/g.

COMPARATIVE EXAMPLE 2

Example 1 was repeated but with air having a temperature of 70° C. and a low gas velocity which has led to no fluidization.

The granules remained free-flowing and transparent and amorphous. No agglomerates have formed.

EXAMPLE 3

Air at 150° C. flowed at a superficial velocity of 1.7 m/s through the pellets from Example 1 in the same cylinder for 8 minutes. The pellets have agglomerated to give an agglomerated block and were opaque and crystalline. The agglomerated block could be disintegrated into individual pellets by a pressure pulse of 0.5 bar.

EXAMPLE 4

Example 3 was repeated but with pellets from Example 2. The pellets were agglomerated to give an agglomerated block and were opaque and crystalline. The agglomerated block could be disintegrated into individual pellets by a pressure pulse of 0.5 bar.

COMPARATIVE EXAMPLE 3

Example 3 was repeated but with untreated pellets. The pellet had a Tg of 69.7° C. and a Tg discontinuity of 67 mW/g. The pellets have agglomerated to give an agglomerated block and were opaque and crystalline. The agglomerated block could not be disintegrated even by 20 pressure pulses of 0.5 bar.

COMPARATIVE EXAMPLE 4

Example 3 was repeated but with the pellets from Comparative Example 2. The pellets have agglomerated to give an agglomerated block and were opaque and crystalline. The agglomerated block could not be disintegrated even by 20 pressure pulses of 0.5 bar.

EXAMPLE 5

A polyethylene terephthalate having a comonomer content of 2 mol % of isophthalic acid and an IV value of 0.5 dl/g was extruded and pellets having a pellet weight of 18 mg were produced therefrom. Directly after the pelletizing, air at a temperature of 70° C. flowed through 2.5 kg of pellets in a cylinder with a perforated plate having a diameter of 20 cm for 15 minutes, resulting in a light fluidized bed whose average expansion exceeded the original height of fill by 8 cm. A cycle time of 0.46 seconds was established via a pulsator. This results in a specific kinetic energy input of 0.78 J/kg per impact or 1530 J/kg in total. The pellets remained free-flowing and transparent and amorphous during the entire test time. No agglomerates have formed. The pellet had a Tg of 72.5° C. and a Tg discontinuity of 100 mW/g.

EXAMPLE 6

Example 5 was repeated but only for 5 minutes, with the result that the total specific kinetic energy input decreased to 510 J/kg.

The pellets remained free-flowing and transparent and amorphous during the entire test time. No agglomerates have formed.

EXAMPLE 7

Air at 175° C. flowed at a superficial velocity of 1.8 m/s through the pellets from Example 5 in the same cylinder for 8 minutes. The pellets have agglomerated to give an agglomerated block and were opaque and crystalline. The agglomerated block could be disintegrated into individual pellets by a pressure pulse of 0.5 bar.

EXAMPLE 8

Example 7 was repeated but with pellets from Example 6. The pellets were agglomerated to give an agglomerated block and were opaque and crystalline. The agglomerated block could be disintegrated into individual pellets by 11 pressure pulses of 0.5 bar.

In Table 1, the specific kinetic energy in total and per impact are summarized together with the test parameters and the tendency to agglomerate.

| Pretreatment | Crystallization | T | t | Ez | E | Impacts | Remark |
|---|---|---|---|---|---|---|---|
| Example 1 | Example 3 | 60° C. | 15 min | 0.78 J/kg | 1530 J/kg | 1 | |
| Example 2 | Example 4 | 80° C. | 15 min | 0.78 J/kg | 1530 J/kg | 1 | |
| C Example 1 | none | 90° C. | 12 min | — | — | — | agglomerated |
| none | C Example 3 | — | — | — | — | >20 | agglomerated |
| C Example 2 | C Example 4 | 70° C. | 15 min | 0 | 0 | >20 | agglomerated |
| Example 5 | Example 7 | 70° C. | 15 min | 0.78 J/kg | 1530 J/kg | 1 | |
| Example 6 | Example 8 | 70° C. | 5 min | 0.78 J/kg | 510 J/kg | 11 | |

In Table 2, the Tg and the Tg discontinuity are summarized together with the test parameters and the tendency to agglomerate.

| Pretreatment | Crystallization | T | t | Tg | Tg discontinuity | Impacts | Remark |
|---|---|---|---|---|---|---|---|
| Example 1 | Example 3 | 60° C. | 15 min | 72.2° C. | 67 mW/g | 1 | |
| C Example 1 | none | 90° C. | 12 min | 72.2° C. | 87 mW/g | — | agglomerated |
| none | C Example 3 | — | — | 69.7° C. | 67 mW/g | >20 | agglomerated |
| Example 5 | Example 7 | 70° C. | 15 min | 72.5° C. | 100 mW/g | 1 | |

EXAMPLE 9

The same material as that used for Comparative Example 3 was preheated in an oven to 70° C. and then treated for 10 minutes in a mixing drum having a diameter of 40 cm and 4 product drivers at 1 revolution per second. If a height of fall of 40 cm and 2 impacts per revolution are assumed, a specific kinetic energy input of 3.9 J/kg per impact or 9400 J/kg in total results.

The pellets remained free-flowing and transparent and amorphous during the entire test time. No agglomerates have formed.

EXAMPLE 10

Air at 175° C. flowed at a superficial velocity of 1.8 m/s through the pellets from Example 9 in the same cylinder for 8 minutes. The pellets have agglomerated to give an agglomerated block and were opaque and crystalline. The agglomerated block could be disintegrated into individual pellets by a pressure pulse of 0.5 bar.

EXAMPLE 11

The same material as that used for Comparative Example 3 was treated continuously with a throughput of 400 kg/h in a pulsed fluid bed having an area of 0.3 m2. The pellets were fed in at 20° C. The treatment gas had a temperature of 80° C. The pellets heated up to 74° C. thereby. The average residence time of the treatment (including heating) was 3.6 minutes. The gas velocity was 2 m/s. The fluidization height was 10 cm. A cycle time of 0.5 second was established via a pulsator. This results in a specific kinetic energy input of 1 J/kg per impact or 420 J/kg in total.

The pellets remained free-flowing and transparent and amorphous during the entire test time. No agglomerates have formed. The pellet had a Tg of 75.1° C. and a Tg discontinuity of 96 mW/g.

EXAMPLE 12

Air at 175° C. flowed at a superficial velocity of 1.8 m/s through the pellets from Example 11 in a cylinder for 8 minutes. The pellets have agglomerated to give an agglomerated block and were opaque and crystalline. The agglomerated block could be disintegrated into individual pellets by two pressure pulses of 0.5 bar.

In Table 3, the specific kinetic energy in total and per impact are summarized together with the test parameters and the tendency to agglomerate.

| Pretreatment | Crystallization | T | t | Ez | E | Impacts | Remark |
|---|---|---|---|---|---|---|---|
| none | C Example 3 | — | — | — | — | >20 | agglomerated |
| Example 9 | Example 10 | 70° C. | 10 min | 3.9 J/kg | 9400 J/kg | 1 | |
| Example 11 | Example 12 | 70° C. | 4 min | 1.0 J/kg | 420 J/kg | 2 | |

In Table 4, the Tg and the Tg discontinuity are summarized together with the test parameters and the tendency to agglomerate.

| Pretreatment | Crystallization | T | t | Tg | Tg discontinuity | Impacts | Remark |
|---|---|---|---|---|---|---|---|
| none | C Example 3 | — | — | 69.7° C. | 67 mW/g | >20 | agglomerated |
| Example 9 | Example 10 | 70° C. | 10 min | | | 1 | |
| Example 11 | Example 12 | 70° C. | 4 min | 75.1° C. | 96 mW/g | 2 | |

From the examples, it is evident that complex relationships exist between the temperature, the duration of treatment and intensity of treatment and the resulting change in the tendency to agglomerate and the Tg discontinuity. In general, it is observed that the treatment improves with increasing duration and intensity and at treatment temperatures close to the Tg.

Figure 1:
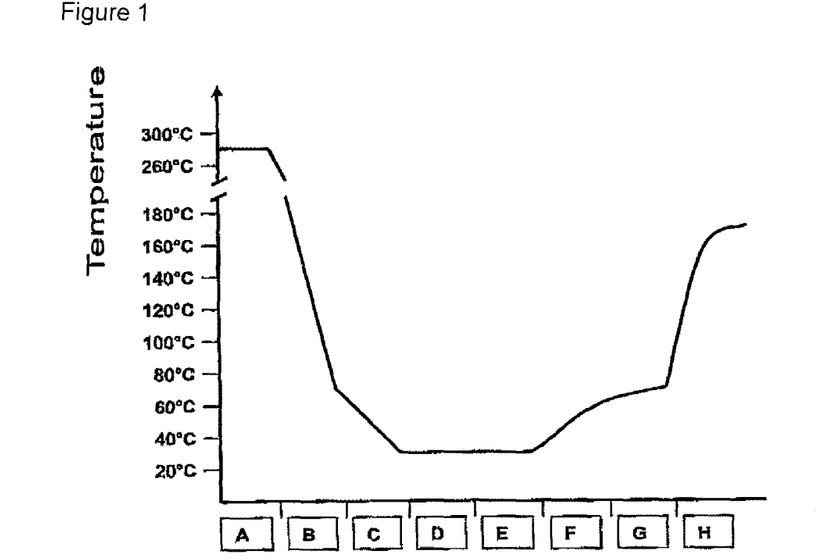
FIG. 1 shows a diagram of the temperature curve of a first embodiment of the method according to the invention.
Figure 2:
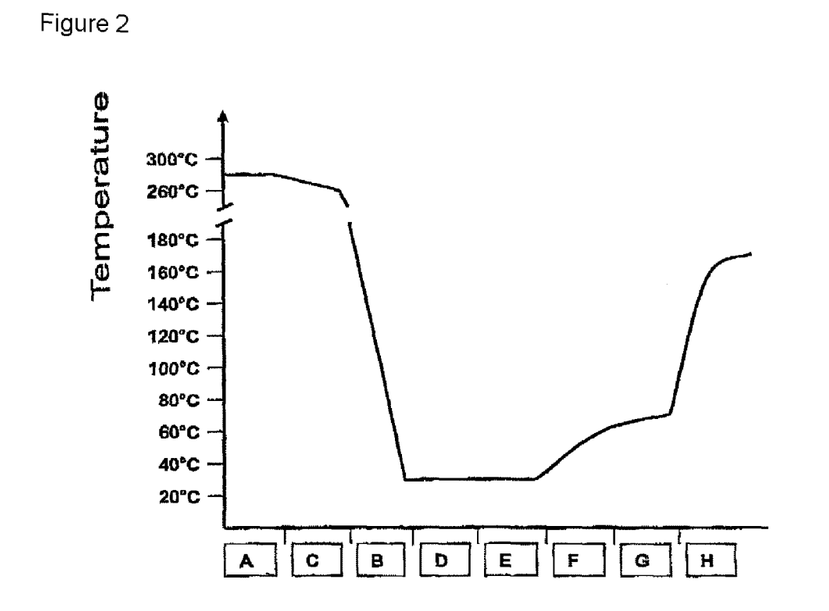
FIG. 2 shows a diagram of the temperature curve of a second embodiment of the method according to the invention.
Figure 3:
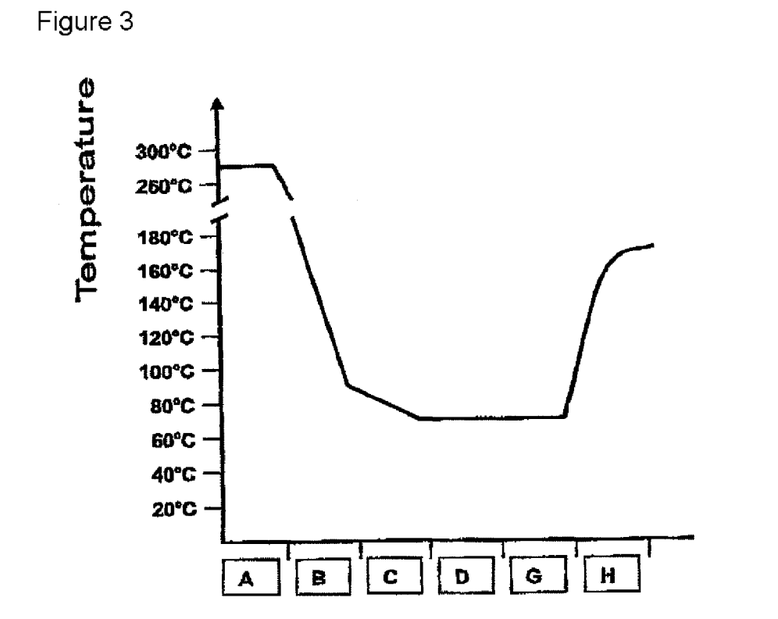
FIG. 3 shows a diagram of the temperature curve of a third embodiment of the method according to the invention.

FIGS. 1, 2 and 3 show the temperature curve of the method according to the invention for the preparation of semicrystalline polyethylene terephthalate (PET). The polymer passes through said process steps A to H:

A: Reactor and die, preparation of the polymer melt and forming of extrudates
B: Cooling zone, cooling of the extrudates/pellets
C: Pelletization, cutting of the extrudates to give pellets
D: Classifying screen, separating off fine fraction and oversizes
E: Buffer, silos, storage of the pellets
F: Heater, heating of the pellets to treatment temperature
G: Shaking apparatus, shaking of the pellets
H: Crystallizer, crystallization of the pellets.

FIG. 1 relates to a pelletization method for the production of cylindrical pellets with the possibility of intermediate storage and subsequent independent crystallization.

The PET melt passes at about 280° C. from a polymer reactor to a die and during this procedure passes through any pumps, mixers, conditioners and filters. In the die, a multiplicity of polymer extrudates is formed. The polymer extrudates are cooled with water and cut into individual pellets under water. Thereafter, water is separated off and dust and oversized pellets and pellet agglomerates are separated off. The pellets are transported at about 30° C. into storage silos. At a later time, the pellets are removed from the silo and heated to about 70° C. in a fluidized-bed apparatus. Simultaneously with the heating, shaking is effected. Thereafter, the pellets are heated to about 170° C. for crystallization and are crystallized.

FIG. 2 relates to an underwater pelletizing method for the production of spherical pellets with the possibility of intermediate storage and subsequent independent crystallization.

The PET melt passes at about 280° C. from a polymer reactor to a die and during this procedure passes through any pumps, mixers, conditioners and filters. In the die, a multiplicity of polymer extrudates is formed. The polymer extrudates are cut directly at the die into individual pellets and cooled with water. Thereafter, water is separated off and dust and oversized pellets and pellet agglomerates are separated off. The pellets are transported at about 30° C. into storage silos. At a later time, the pellets are removed from the silo and heated to about 70° C. in a fluidized-bed apparatus. Simultaneously with the heating, shaking is effected. Thereafter, the pellets are heated to about 170° C. for crystallization and are crystallized.

FIG. 3 relates to a pelletizing method for the production of cylindrical pellets with direct connection to the subsequent crystallization.

The PET melt passes at about 280° C. from a polymer reactor to a die and during this procedure passes through any pumps, mixers, conditioners and filters. In the die, a multiplicity of polymer extrudates is formed. The polymer extrudates are cooled with water and cut into individual pellets under water. Water is then separated off. The cooling conditions are chosen so that the pellets are fed at about 70° C. to a screening and shaking apparatus. Thereafter, the pellets are heated to about 170° C. for crystallization and are crystallized.

Figure 4:
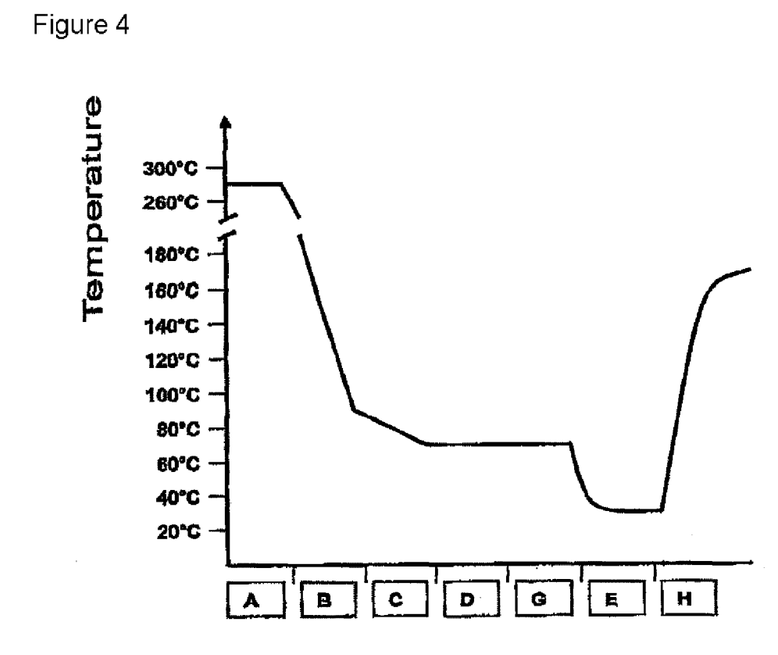
FIG. 4 shows a diagram of the temperature curve of a fourth embodiment of the method according to the invention.

FIG. 4 relates to a pelletizing method for the production of cylindrical pellets with the possibility of intermediate storage and subsequent independent crystallization, the shaking being coupled to the pelletizing.

The PET melt passes at about 280° C. from a polymer reactor to a die and during this procedure passes through any pumps, mixers, conditioners and filters. In the die, a multiplicity of polymer extrudates is formed. The polymer extrudates are cooled with water and cut into individual pellets under water. Water is then separated off. The cooling conditions are chosen so that the pellets are fed at about 70° C. to a screening and shaking apparatus. Thereafter, the pellets are cooled and are transported at about 30° C. into storage silos. At a later time, the pellets are removed from the silo, heated to about 170° C. for crystallization and crystallized.

Figure 5:
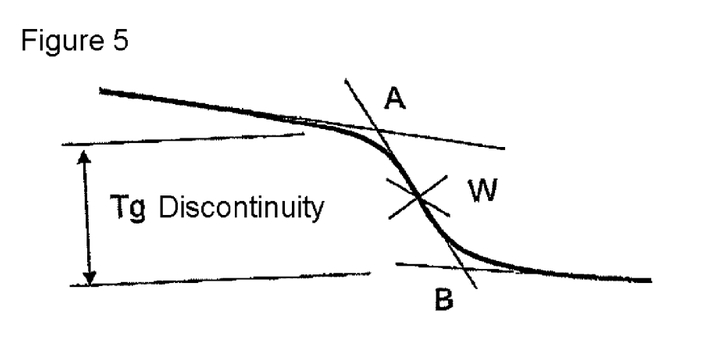
FIG. 5 shows a diagram of the evaluation of the Tg discontinuity.

FIG. 5 shows a typical DSC curve on exceeding the glass transition temperature. Point W designates the point of inflection. Point A designates the onset, formed from extrapolated base line and extrapolated slope at the point of inflection. Point B designates the endset, formed from extrapolated base line and extrapolated slope at the point of inflection. The difference in the heat flux between point A and B corresponds to the Tg discontinuity.

Figure 6:
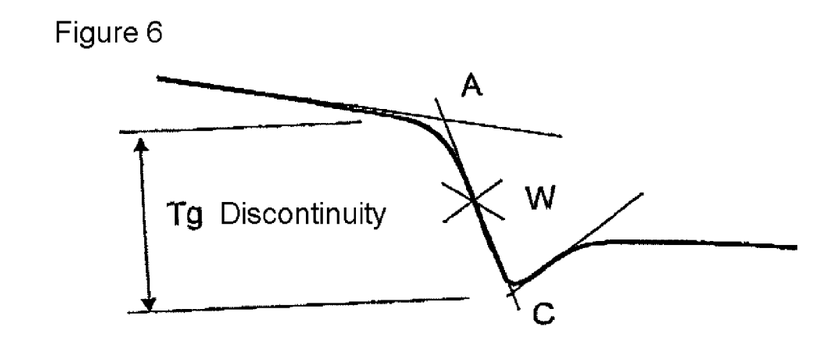
FIG. 6 shows a further diagram of the evaluation of the Tg discontinuity.

FIG. 6 shows a typical DSC curve on exceeding the glass transition temperature. Point W designates the point of inflection. Point A designates the onset, formed from extrapolated base line and extrapolated slope at the point of inflection. Point C designates the endset and corresponds to the extrapolated peak, formed from peak end slope and extrapolated slope at the point of inflection. The difference in the heat flux between point A and C corresponds to the Tg discontinuity.

The invention claimed is:

1. A method for the preparing a semicrystalline polymer, comprising steps of:
    a) preparing a polymer melt from a crystallizable polymer;
    b) forming and solidifying particles of the polymer melt, wherein formation of the particles may be effected before or after solidification;
    c) cooling the particles;
    d) treating the particles for reducing their tendency to agglomerate;
    e) crystallizing the particles;
    wherein the treating step is effected between the cooling of the particles and the crystallizing the particles by shaking for one minute to thirty minutes at a temperature T1 which is below the glass transition temperature Tg of the polymer plus 10° C., i.e. T1<Tg+10° C., wherein a multiplicity of impacts is transmitted to the particles by the shaking, wherein the average number of impacts on the particles is more than 150 and a specific kinetic energy input per impact of more than 0.1 J/kg is effected, and wherein the crystallizing is effected in a thermal manner under supply of heat.

2. The method according to claim 1, wherein T1 is greater than or equal to Tg−60° C.

3. The method according to claim 2, wherein the cooling of the particles is effected to a temperature T2 in the range from Tg-60° C. to Tg+10° C.

4. The method according to claim 2, wherein the cooling of the particles is effected to a temperature T2 below Tg-60° C. and wherein a further step of heating to the temperature T1 is effected before the crystallizing step.

5. The method according to claim 1, wherein the treating step comprises shaking at the temperature T1 in the range from Tg-40° C. to Tg+5° C.

6. The method according to claim 5, wherein the cooling of the particles is effected to a temperature T2 in the range from Tg-40° C. to Tg+5° C.

7. The method according to claim 5, wherein the cooling of the particles is effected to a temperature T2 below Tg-40° C. and wherein a further step of heating to the temperature T1 is effected before the crystallizing step.

8. The method according to claim 1, wherein the cooling of the particles is effected in a cooling fluid and wherein a separation of the particles from the cooling fluid is effected before treating the particles for reducing their tendency to agglomerate.

9. The method according to claim 1, wherein the intensity and duration of the shaking are chosen such that the tendency of the particles to agglomerate in the crystallizing step decreases by at least a factor of 2.

10. The method according to claim 1, wherein the intensity and duration of the shaking is chosen such that the Tg discontinuity in the DSC increases by at least a factor of 1.2.

11. The method according to claim 1, wherein the intensity and duration of the shaking is chosen such that the Tg discontinuity in the DSC increases by at least a factor of 1.3.

12. The method according to claim 1, wherein the shaking is effected by a fluidization with the aid of a process gas.

13. The method according to claim 1, wherein the shaking is effected by mechanical movement.

14. The method according to claim 1, wherein a step for separating off undesirably large particles, or undesirably small particles, or both, is effected between the step for cooling the particles and the crystallizing step.

15. The method according to claim 1, wherein a multiplicity of impacts is transmitted to the particles by the shaking, wherein the average number of impacts on the particles is more than 300.

16. The method according to claim 1, wherein a multiplicity of impacts is transmitted to the particles by the shaking, wherein the average number of impacts on the particles is more than 500.

17. The method according to claim 1, wherein a multiplicity of impacts is transmitted to the particles by the shaking, wherein a specific kinetic energy input per impact of more than 0.5 J/kg is effected.

18. The method according to claim 1, wherein a multiplicity of impacts is transmitted to the particles by the shaking, wherein a specific kinetic energy input per impact of more than 1 J/kg is effected.

19. The method according to claim 1, wherein a multiplicity of impacts is transmitted to the particles by the shaking, wherein altogether a specific kinetic energy input of more than 200 J/kg is effected.

20. The method according to claim 1, wherein a multiplicity of impacts is transmitted to the particles by the shaking, wherein altogether a specific kinetic energy input of more than 400 J/kg is effected.

21. The method according to claim 1, wherein a multiplicity of impacts is transmitted to the particles by the shaking, wherein altogether a specific kinetic energy input of more than 800 J/kg is effected.

22. The method according to claim 1, wherein the polymers are polycondensates.

23. The method according to claim 22, wherein the polycondensates are selected from the group consisting of polyamides, polyesters, polycarbonate, polyhydroxyalkanoates, polylactides, and copolymers thereof.

24. The method according to claim 23, wherein the polyester is a polyethylene terephthalate or one of its copolymers.

25. The method according to claim 23, wherein the shaking is effected at a temperature in the range from 30° C. to 85° C.

26. The method according to claim 23, wherein the shaking is effected at a temperature in the range from 50° C. to 80° C.

* * * * *